United States Patent Office 3,152,140
Patented Oct. 6, 1964

3,152,140
3-OXAZOLIDINO-LOWER-ALKANOYLANILINES
Bernard L. Zenitz, Colonie, N.Y., assignor to Sterling Drug Inc., New York, N.Y., a corporation of Delaware
No Drawing. Original application Apr. 22, 1960, Ser. No. 23,919. Divided and this application May 4, 1962, Ser. No. 196,027
5 Claims. (Cl. 260—307)

This invention relates to new 3-oxazolidino-lower-alkanoylanilines, their acid-addition salts and to methods for the preparation thereof.

The 2-hydroxyethyl-tertiary amino-N-lower-alkanoylanilines hitherto known have all lacked any further substitution on the 1-carbon atom of the 2-hydroxyethyl group. The concept of the present invention resides in replacing the 2-hydroxyethyl-tertiary-amino group of such known compounds by a 3-oxazolidino group whereby new and useful compounds are obtained.

The compounds of the invention have the Formula II

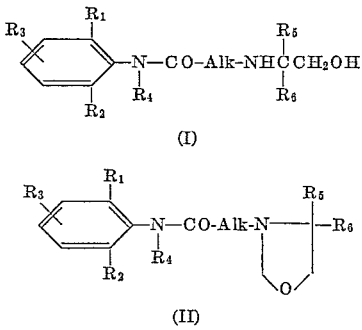

wherein $R_1$, $R_2$ and $R_3$ each independently represents hydrogen, lower-alkyl, lower-alkoxy or halogen radicals which can be the same or different; $R_4$ represents hydrogen or lower-alkyl; $R_5$ and $R_6$ each independently represents lower-alkyl or the hydroxymethyl group; and Alk represents lower-alkylene. The compounds of Formula I, which are intermediates for the preparation of the compounds of Formula II, are disclosed and claimed in my copending parent application Serial No. 23,919.

When $R_1$, $R_2$, $R_3$, $R_4$, $R_5$ and $R_6$ represent lower-alkyl radicals or when $R_1$, $R_2$ and $R_3$ represent lower-alkoxy radicals, they can have from one to about four carbon atoms and can be straight or branched and thus stand for such groups as methyl, ethyl, propyl, isopropyl, butyl, isobutyl, methoxy, ethoxy, propoxy, isopropoxy, butoxy, isobutoxy, and the like. When $R_1$, $R_2$ and $R_3$ represent halogen atoms, they stand for any of the four halogens, fluorine, chlorine, bromine and iodine. A particularly preferred class of compounds are those in which $R_1$ and $R_2$ represent lower-alkyl radicals and $R_3$ represents hydrogen.

In the above general Formulas I and II, Alk represents a lower-alkylene radical which contains from one to about five carbon atoms and can be either straight or branched. Thus the group CO-Alk includes such groups, inter alia, as acetyl ($COCH_2$), beta-propionyl ($COCH_2CH_2$), alpha-propionyl ($COCHCH_3$), gamma-butyryl ($COCH_2CH_2CH_2$)

alpha-methyl-beta-propionyl ($COCHCH_3CH_2$), beta-butyryl ($COCH_2CHCH_3$), delta-valeryl ($COCH_2CH_2CH_2CH_2$)

alpha-methyl-gamma-butyryl ($COCHCH_3CH_2CH_2$), epsilon-caproyl ($COCH_2CH_2CH_2CH_2CH_2$), and the like.

The compounds of Formula I are prepared by reacting a halo-lower-alkanoylaniline with a 2-hydroxyethylamine ($R_5$ and $R_6$ are lower-alkyl), a 1-hydroxymethyl-1-lower-alkyl-2-hydroxyethylamine ($R_5$ is lower-alkyl; $R_6$ is hydroxymethyl), or a 1,1-bis-(hydroxymethyl)-2-hydroxyethylamine ($R_5$ and $R_6$ are hydroxymethyl) as illustrated by the equation given below where $R_1$, $R_2$, $R_3$, $R_4$, $R_5$, $R_6$ and Alk have the meanings given above and Hal represents halogen.

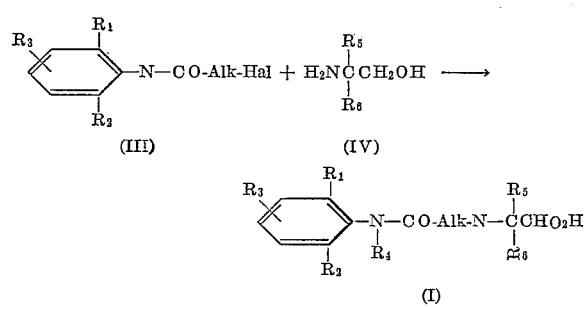

A preferred method comprises heating a 2-hydroxyethylamine, 1-hydroxymethyl-1-lower-alkyl-2-hydroxyethylamine or 1,1-bis(hydroxymethyl)-2-hydroxyethylamine with a halo-lower-alkanoylaniline at a temperature in the range from about 50° C. to 150° C. in the presence of an acid-acceptor. The reaction is preferably carried out in an organic solvent, inert under the conditions of the reaction, for example methanol, ethanol, propanol, acetonitrile, benzene, xylene and the like. The purpose of the acid-acceptor is to take up the hydrogen halide which is split out during the course of the reaction. The acid-acceptor is a basic substance which forms water-soluble by-products easily separable from the main product of the reaction, and includes such substances as alkali metal salts of weak acids, i.e., sodium carbonate, potassium carbonate, sodium acetate or sodium alkoxides. The acid-acceptor can also be in the form of an excess quantity of the 2-hydroxyethylamine, 1-hydroxymethyl-1-lower-alkyl-2-hydroxyethylamine or 1,1-bis(hydroxymethyl)-2-hydroxyethylamine.

The compounds of Formula II are prepared by reacting the compounds of Formula I with formaldehyde. The reaction is preferably carried out by heating the formaldehyde and the 2-hydroxyethylamino-, 1-hydroxymethyl-1-lower-alkyl-2-hydroxyethylamino- or 1,1-bis(hydroxymethyl) - 2 - hydroxyethylamino-lower-alkanoylaniline of Formula I at a temperature in the range from about 70° C. to about 150° C. in an organic solvent inert under the conditions of the reaction and with means for separating the water formed in the reaction. The water formed in the reaction is conveniently separated from the reaction by azeotropic distillation with the solvent used. Suitable solvents are water-immiscible solvents, for example benzene, toluene, xylene, and the like. A preferred solvent is benzene. The formaldehyde used can be in the form of an aqueous solution, such as formalin, or in the form of a polymeric form of formaldehyde, such as trioxymethylene or paraformaldehyde.

The intermediate halo-lower-alkanoylanilines of Formula III are known compounds and are prepared by reacting an aniline with a slight molar excess of a halo-lower-alkanoyl halide. The reaction is preferably conducted in an organic solvent inert under the conditions of the reaction, for example benzene, toluene, xylene and the like, at a temperature in the range from about 70° C. to about 140° C. The halo-lower-alkanoyl-N-lower-alkylanilines are prepared similarly by reacting a halo-lower-alkanoyl halide with an N-lower-alkyl-substituted-aniline. The latter in turn are prepared by reducing the corresponding N-lower-alkanoyl-substituted-anilines with an alkali metal aluminum hydride, for example, lithium aluminum hydride, in an organic solvent inert under the conditions of the reaction, for example, ether or tetrahydrofuran.

The intermediate 2-hydroxyethylamines and 1-hydroxymethyl-2-hydroxyethylamines of Formula IV ($R_5$ is lower-alkyl or hydroxymethyl, $R_6$ is lower-alkyl) are prepared by reacting an appropriate nitroalkane with one or with two molar equivalents of formaldehyde, respectively, in the presence of a basic catalyst such as alkali metal carbonates, alkali metal hydroxides or alkali metal alkoxides and reducing the resulting 2-nitro-lower-alkanol or 2-nitro-2-lower-alkyl-1,3-propanediol with hydrogen in the presence of a catalyst such as palladium-on-charcoal. The condensation of the nitroalkane with formaldehyde and the subsequent reduction of the resulting nitro-compound are preferably conducted in an organic solvent inert under the conditions of the reaction, for example methanol or ethanol.

The novel compounds of the instant invention are the bases of Formula II and the acid-addition salts of said bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxide, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formula II not only represents the structural configuration of the bases of my invention but is also representative of the structural entity which is common to all my compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can if desired be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 3-oxazolidinyl-lower-alkanoylanilines and not in any particular acid moiety or acid anion associated with the salt forms of my compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common cation or ammonium ion.

Thus the acid-addition salts discussed above and claimed herein are prepared from any organic acid, inorganic acid (including organic acids having an inorganic group therein), or organo-metallic acid as exemplified by organic mono- or polycarboxylic acids such as found, for example, in Beilstein's Organische Chemie, 4th ed., volumes III, IV, IX, X, XIV, XVII, XIX, XXI, XXII and XXV; organic mono- and polysulfonic and -sulfinic acids such as found, for example in Beilstein, volumes VI, XI, XVI, and XXII; organic phosphonic and phosphinic acids such as found, for example, in Beilstein, volumes XI and XVI; organic acids of arsenic and antimony such as found, for example, in Beilstein, volume XVI; organic heterocyclic carboxylic, sulfonic, and sulfinic acids such as found, for example, in Beilstein, volumes XVIII, XXII, and XXV; acidic ion-exchange resins, for example Amberlite® XE-66 resin; and inorganic acids of any acid forming element or combination of elements such as found in Mellor, Comprehensive Treatise on Inorganic and Theoretical Chemistry, Longman's, Green and Co., New York, N.Y., volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds such as found, for example, in volume VI of Beilstein, acidic compounds having "activated" or acidic hydrogen atoms, as for example, picrolonic acid, or barbituric acid derivatives having an acidic proton such as found, for example, in Cox et al., Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, α-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE-66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The compounds of my invention have pharmacodynamic properties, in particular, local anesthetic activity. Local anesthetic activity was determined according to the method of Bulbring and Wajda, J. Pharmacol. and Exptl. Therap. 85, 78 (1945), by injecting aqueous solutions of the acid-addition salts intradermally on the backs of guinea pigs using varying concentrations of solutions graded at 0.3 log intervals. The sensitivity of the wheals thereby produced was tested every five minutes for a period of thirty minutes by pricking the skins with a set of six pinpricks spaced at about one second intervals. The score for each wheal was obtained by the addition of the number of pinpricks which failed to elicit the reflex skin twitch at each reading. The average score for each concentration was plotted against the log of the concentration. The concentration expected to yield a score of 5, which was taken as the Threshold Activity Concentration ($TAC_5$), was estimated by extrapolation from the dose-response curves.

The irritancies of the compounds were determined using the trypan blue irritation test procedure described by Hoppe et al., J. Am. Pharm. Assoc. 39, 147 (1950), as modified by Luduena and Hoppe, J. Pharm. and Exptl. Therap. 104, 40 (1952). In the test, each compound in a saline solution was injected at three or more concentrations graded at 0.3 log intervals into ten test areas per concentration. The average irritation score for each concentration was plotted against the dose on semi-log paper and the value corresponding to a score of 4 was read from the graph. This value was called the Threshold Irritancy Concentration-4 ($TIC_4$) and is taken to be the concentration expected to produce an average degree of irritation.

The toxicities of the compounds were determined by intravenous injection in mice at various dose levels, and the $LD_{50}$, the dose lethal to fifty percent of the animals at that dose level, was estimated.

The compounds of my invention can be formulated in the manner conventional for local anesthetics. For example, they can be conveniently used as their acid-addition salts, for example hydrochlorides, in aqueous liquid preparations. These preparations can be administered topically or injected intramuscularly or intravenously. Alternatively they can be prepared for use as salves or creams for topical application by mixing with known adjuvants, for example, petroleum jelly. My compounds can also be advantageously combined with other pharmacologically active compounds, e.g., vasoconstrictor agents.

The structures of the compounds of the invention are established by their mode of synthesis and corroborated by the correspondence between calculated values for the elements and values found by chemical analysis.

PREPARATION OF INTERMEDIATES

Example 1

N-methyl-2,6-dimethylaniline: To a stirred mixture of 19g. (0.50 mole) of lithium aluminum hydride in 200 ml. of dry tetrahydrofuran, there was added over a period of about one hour a slurry of 37.3 g. (0.25 mole) of N-formyl-2,6-xylidine in 800 ml. of tetrahydrofuran. The mixture was heated under reflux for about eighteen hours, cooled to about 15° and the excess lithium aluminum hydride decomposed by dropwise addition of 40 ml. of water in 40 ml. of tetrahydrofuran. The mixture was filtered, the filter cake washed with about 200 ml. of tetrahydrofuran, and the filtrate was taken to dryness under reduced pressure. The oily residue was distilled at 29 mm. Hg and the fraction boiling at 100–104.5° C. was collected as product. There was thus obtained 26.5 g. of N-methyl-2,6-dimethylaniline.

*Analysis.*—Calcd. for $C_9H_{13}N$: N, 10.35. Found: N, 10.22.

Example 2

N-ethyl-2,6-dimethylaniline was prepared from 40.8 g. (0.25 mole) of N-acetyl-2,6-xylidine in 650 ml. of dry tetrahydrofuran and 19.0 g. (0.50 mole) of lithium aluminum hydride in 150 ml. of dry tetrahydrofuran following the manipulative procedure described above in Example 1. The product was collected at 93–95° C./15 mm. giving 10.1 g. of N-ethyl-2,6-dimethylaniline; $n_D^{25}$ 1.5225.

*Analysis.*—Calcd. for $C_{10}H_{15}N$: N, 9.38. Found: N, 9.29.

Example 3

N-n-propyl-2,6-dimethylaniline was prepared from 53.2 g. (0.3 mole) of N-propionyl-2,6-dimethylaniline in 600 ml. of dry tetrahydrofuran and 23.0 g. (0.6 mole) of lithium aluminum hydride in 400 ml. of dry tetrahydrofuran following the manipulative procedure described above in Example 1. The product was collected at 118.5–120° C./24 mm. giving 35.5 g. of N-n-propyl-2,6-dimethylaniline, $n_D^{25}$ 1.5176.

*Analysis.*—Calcd. for $C_{11}H_{17}N$: N, 8.57. Found: N, 8.72.

Example 4

Alpha-chloro-N-acetyl-N-methyl-2,6-dimethylaniline [III; $R_1$, $R_2$ and $R_4$ are $CH_3$, $R_3$ is H, Alk is $CH_2$, Hal is Cl]: In a beaker cooled in an ice bath and equipped with a mechanical stirrer and a thermometer, 24.1 g. (0.20 mole) of N-methyl-2,6-dimethylaniline was dissolved in 158 ml. of glacial acetic acid. The temperature of the solution was lowered to about 10° C., and 22.8 g. (0.20 mole) of chloroacetyl chloride was added all at once with stirring. A chilled solution of 61.3 g. (0.88 mole) of sodium acetate in 250 ml. of water was added portion-wise at about 10–15° C. The solution was stirred for one hour in an ice bath and then diluted with about 2.5 liters of water. The solid which separated was filtered, air-dried and recrystallized from an ethanol-water mixture giving 9.2 g. of alpha-chloro-N-acetyl-N-methyl-2,6-dimethylaniline, M.P. 59.5–61° C. (uncorr.).

*Analysis.*—Calcd. for $C_{11}H_{14}ClNO$: N, 6.63; Cl, 16.77. Found: N, 6.39; Cl, 16.90.

Example 5

Beta-chloro-N-propionyl-N-methyl-2,6-dimethylaniline [III; $R_1$, $R_2$ and $R_4$ are $CH_3$, $R_3$ is H, Alk is $CH_2CH_2$, Hal is Cl] was prepared by adding a solution of 15.22 g. (0.12 mole) of beta-chloropropionyl chloride in 60 ml. of dry benzene to a solution of 13.52 g. (0.10 mole) of N-methyl-2,6-dimethylaniline in 100 ml. of dry benzene and refluxing the mixture for one hour. The mixture was then washed with water, the organic layer dried, the solvent removed in vacuo and the product purified by distillation in vacuo giving 17.1 g. of beta-chloro-N-propionyl-N-methyl-2,6-dimethylaniline, B.P. 95–103° C./0.14 mm., $n_D^{25}$ 1.5357.

*Analysis.*—Calcd. for $C_{12}H_{16}ClNO$: C, 63.82; H, 7.14; N, 6.20. Found: C, 63.83; H, 7.08; N, 6.30.

Example 6

Alpha-bromo-N-propionyl-N-methyl-2,6-dimethylaniline [III; $R_1$, $R_2$ and $R_4$ are $CH_3$, $R_3$ is H, Alk is $CHCH_3$, Hal is Br] was prepared from 13.5 g. (0.1 mole) of N-methyl-2,6-dimethylaniline in 100 ml. of dry benzene and 25.9 g. (0.12 mole) of alpha-bromopropionyl bromide following the manipulative procedure described above in Example 5. The product was recrystallized from hexane giving 17.1 g. of alpha-bromo-N-propionyl-N-methyl-2,6-dimethylaniline, M.P. 80–81.5° C. (uncorr.).

*Analysis.*—Calcd. for $C_{12}H_{16}BrNO$: C, 53.34; H, 5.97; Br, 29.6. Found: C, 53.29; H, 5.77; Br, 29.4.

Example 7

Alpha-chloro-N-acetyl-N-ethyl - 2,6 - dimethylaniline [III; $R_1$ and $R_2$ are $CH_3$, $R_3$ is H, $R_4$ is $C_2H_5$, Alk is $CH_2$, Hal is Cl] was prepared from 9.6 g. (0.64 mole) of N-ethyl-2,6-dimethylaniline in 60 ml. of dry toluene and 15 ml. of chloroacetyl chloride following the manipulative procedure described above in Example 5. The product was recrystallized from pentane giving 10.8 g. of alpha-chloro-N-acetyl-N-ethyl-2,6-dimethylaniline, M.P. 41–43° C. (uncorr.).

*Analysis.*—Calcd. for $C_{12}H_{16}ClNO$: C, 63.82; H, 7.14; N, 6.20. Found: C, 63.97; H, 7.05; N, 6.23.

Example 8

Beta-chloro-N-propionyl-N-ethyl - 2,6 - dimethylaniline [III; $R_1$ and $R_2$ are $CH_3$, $R_3$ is H, $R_4$ is $C_2H_5$, Alk is $CH_2CH_2$, Hal is Cl] was prepared from 14.9 g. (0.10 mole) of N-ethyl-2,6-dimethylaniline in 100 ml. of dry benzene and 15.22 g. (0.12 mole) of beta-chloropropionyl chloride following the manipulative procedure described above in Example 5. The product was purified by distillation in vacuo giving 17.9 g. of beta-chloro-N-propionyl-N-ethyl-2,6-dimethylaniline, B.P. 100–102° C./0.1 mm., $n_D^{25}$ 1.5320.

*Analysis.*—Calcd. for $C_{13}H_{18}ClNO$: N, 5.84; Cl, 14.80. Found: N, 5.94; Cl, 15.00.

Example 9

Alpha-chloro-N-acetyl-N-n-propyl-2,6 - dimethylaniline [III; $R_1$ and $R_2$ are $CH_3$, $R_3$ is H, $R_4$ is n-$C_3H_7$, Alk is $CH_2$, Hal is Cl] was prepared from 16.3 g. (0.1 mole) of N-n-propyl-2,6-dimethylaniline in 150 ml. of dry benzene and 15.0 g. (0.13 mole) of chloroacetyl chloride in 60 ml. of dry benzene following the manipulative procedure described above in Example 5. The product was recrystallized from hexane giving 20.1 g. of alpha-chloro-N-acetyl-N-n-propyl-2,6-dimethylaniline, M.P. 59°–60° C. (uncorr.).

*Analysis.*—Calcd. for $C_{13}H_{18}ClNO$: N, 5.84; Cl, 14.80. Found: N, 5.92; Cl, 15.00.

Example 10

Beta-chloro-N-propionyl-N-n-propyl - 2,6 - dimethylaniline [III; $R_1$ and $R_2$ are $CH_3$, $R_3$ is H, $R_4$ is n-$C_3H_7$, Alk is $CH_2CH_2$, Hal is Cl] was prepared from 16.3 g. (0.10 mole) of N-n-propyl-2,6-dimethylaniline in 125 ml. of dry benzene and 15.2 g. (0.12 mole) of beta-chloro-propionyl chloride in 60 ml. of dry benzene following the manipulative procedure described above in Example 5. The product was purified by distillation in vacuo giving 11.8 g. of beta-chloro-N-propionyl-N-n-propyl-2,6 - dimethylaniline, B.P. 94–106.0° C./0.2 mm., $n_D^{25}$ 1.5296.

*Analysis.*—Calcd. for $C_{14}H_{20}ClNO$: N, 5.53. Found: N, 5.64.

Example 11

Alpha-bromo-N-propionyl-N-n-propyl-2,6 - dimethylaniline [III: $R_1$ and $R_2$ are $CH_3$, $R_3$ is H, $R_4$ is n-$C_3H_7$, Alk is $CHCH_3$, Hal is Br] was prepared from 16.3 g. (0.10 mole) of N-n-propyl-2,6-dimethylaniline in 100 ml. of dry toluene and 25.9 g. (0.12 mole) of alpha-bromo-propionyl bromide in 60 ml. of dry toluene following the manipulative procedure described above in Example 5. The product was recrystallized from hexane giving 18.0 g. of alpha-bromo - N - propionyl-N-n-propyl - 2,6 - dimethyl-aniline, M.P. 50.5–52° C. (uncorr.).

*Analysis.*—Calcd. for $C_{14}H_{20}BrNO$: C, 56.45; H, 6.76; Br, 26.8. Found: C, 56.03; H, 6.52; Br, 26.8.

Example 12

1-methyl-1-ethyl-2-hydroxyethylamine [IV; $R_5$ is $CH_3$, $R_6$ is $CH_3CH_2$]: By reacting 2-nitrobutane with one molar equivalent of formaldehyde in a methanol solution in the presence of sodium methoxide, there can be obtained 2-methyl-2-nitrobutanol which, on catalytic reduction with hydrogen over a palladium-on-charcoal catalyst in an inert organic solvent, for example ethanol, gives 1-methyl-1-ethyl-2-hydroxyethylamine.

Example 13

1-ethyl-1-hydroxymethyl-2-hydroxyethylamine [IV; $R_5$ is $C_2H_5$, $R_6$ is $CH_2OH$]: By following the manipulative procedure described above in Example 12, substituting for the 2-nitrobutane used therein a molar equivalent amount of 1-nitropropane and using two molar equivalents of formaldehyde, there can be obtained 1-ethyl-1-hydroxymethyl-2-hydroxyethylamine.

Example 14

1-isopropyl-1-hydroxymethyl-2-hydroxyethylamine [IV; $R_5$ is $(CH_3)_2CH$, $R_6$ is $CH_2OH$]: By following the manipulative procedure described above in Example 12, substituting for the 2-nitrobutane used therein a molar equivalent amount of 1-nitro-2-methylpropane and using two molar equivalents of formaldehyde, there can be obtained 1-isopropyl-1-hydroxymethyl-2-hydroxethylamine.

Example 15

1,1-diethyl-2-hydroxyethylamine [IV; $R_5$ and $R_6$ are $C_2H_5$]: By following the manipulative procedure described above in Example 12, substituting for the 2-nitrobutane used therein a molar equivalent amount of 3-nitropentane, there can be obtained 1,1-diethyl-2-hydroxyethylamine.

Example 16

1-isobutyl-1-hydroxymethyl-2 - hydroxyethylamine [IV; $R_5$ is iso-$C_4H_9$, $R_5$ is $CH_2OH$]: By following the manipulative procedure described above in Example 12, substituting for the 2-nitrobutane used therein a molar equivalent amount of 1-nitro-3-methylbutane and using two molar equivalent amounts of formaldehyde, there can be obtained 1-isobutyl-1-hydroxymethyl-2-hydroxyethylamine.

Example 17

1-t-butyl - 1 - methyl - 2 - hydroxyethylamine [IV; $R_5$ is t-$C_4H_9$, $R_6$ is $CH_3$]: By following the manipulative procedure described above in Example 12, substituting for the 2-nitrobutane used therein a molar equivalent amount of 2-nitro-3,3-dimethylbutane, there can be obtained 1-t-butyl-1-methyl-2-hydroxyethylamine.

Example 18

1-isobutyl-1-isopropyl-2-hydroxyethylamine [IV; $R_5$ is $(CH_3)_2CH$, $R_6$ is iso-$C_4H_9$]: By following the manipulative procedure described above in Example 12, substituting for the 2-nitrobutane used therein a molar equivalent amount of 3-nitro-2,5-dimethylhexane, there can be obtained 1-isobutyl-1-isopropyl-2-hydroxyethylamine.

Example 19

1-n-propyl-1-hydroxymethyl-2-hydroxyethylamine [IV; $R_5$ is n-$C_3H_7$, $R_6$ is $CH_2OH$]: By following the manipulative procedure described above in Example 12, substituting for the 2-nitrobutane used therein a molar equivalent amount of 1-nitrobutane and using two molar equivalent amounts of formaldehyde, there can be obtained 1-n-propyl-1-hydroxymethyl-2-hydroxyethylamine.

PREPARATION OF FINAL PRODUCTS

Example 20

Alpha-[(1,1-dimethyl-2-hydroxyethyl)amino] - N - acetyl-2,6-dimethylaniline [I; $R_1$, $R_2$, $R_5$ and $R_6$ are $CH_3$, $R_3$ and $R_4$ are H, Alk is $CH_2$]: A solution of 19.8 g. (0.1 mole) of alpha-chloro-N-acetyl-2,6-dimethylaniline and 26.7 g. (0.3 mole) of 1,1-dimethyl-2-hydroxyethylamine in 250 ml. of absolute ethanol was heated under reflux for forty-eight hours. The solvent was then removed under reduced pressure, the residual oil was mixed with 250 ml. of water, basified with potassium carbonate, and extracted with benzene. The benzene extracts were taken to dryness, the residue triturated with ether and the resulting solid collected by filtration. The crude product was recrystallized from an ethyl acetate-hexane mixture giving 15.6 g. of alpha-[(1,1-dimethyl-2-hydroxyethyl)amino]-N-acetyl-2,6-dimethylaniline, M.P. 85.2–87.0° C. (corr.).

*Analysis.*—Calcd. for $C_{14}H_{22}N_2O_2$: $N_{Total}$, 11.19; $N_{Basic}$, 5.60. Found: $N_{Total}$, 11.18; $N_{Basic}$, 5.53.

Pharmacological evaluation of alpha-[(1,1-dimethyl-2-hydroxyethyl)amino]-N-acetyl-2,6-dimethylaniline in aqueous solution in the form of its acid-addition salts administered intradermally in guinea pigs according to the method of Bulbring and Wajda, ibid., described above, has shown that the compound possesses local anesthetic activity. The Threshold Activity Concentration-5 ($TAC_5$) for the compound was thus found to be 0.33%.

The irritancy of alpha-[(1,1-dimethyl-2-hydroxyethyl)amino]-N-acetyl-2,6-dimethylaniline was determined using the trypan blue irritation test of Hoppe et al., ibid., and Luduena et al., ibid., described above. The Threshold Irritancy Concentration-4 ($TIC_4$) for the compound was thus found to be 1.0%.

Intravenous toxicity studies in mice with alpha-[(1,1-dimethyl - 2 - hydroxyethyl)amino] - N - acetyl - 2,6 - dimethylaniline have shown the $LD_{50}$ to be 94±5.4 mg./kg., where $LD_{50}$ is defined as the dose lethal to fifty percent of the animals at that dose level.

Alpha - [(1,1 - dimethyl - 2 - hydroxyethyl)amino] - N-acetyl-2,6-dimethylaniline reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate and boron trifluoride salts.

Alpha - [(1,1 - dimethyl - 2 - hydroxyethyl)amino] - N-acetyl-2,6-dimethylaniline reacts with hydriodic acid to form alpha - [(1,1 - dimethyl - 2 - hydroxyethyl)amino]-N-acetyl-2,6-dimethylaniline hydriodide, useful as a characterizing intermediate.

Alpha - [(1,1 - dimethyl - 2 - hydroxyethyl)amino] - N-acetyl-2,6-dimethylaniline in the form of its hydriodide salt can be converted to the hydrochloride salt by passing an aqueous solution of the former over an ion-exchange resin saturated with chloride ions, for example, Rohm and Haas' Amberline® IRA–400 resin.

Alpha- [(1,1 - dimethyl - 2 - hydroxyethyl)amino] - N-acetyl-2,6-dimethylaniline can be converted to its hydriodide salt and the latter recrystallized for purification purposes from an appropriate organic solvent. On suspension of the hydriodide in dilute aqueous sodium hydroxide, extraction of the suspension with chloroform, and removal of the chloroform from the extracts, alpha-[(1,1 - dimethyl - 2 - hydroxyethyl)amino] - N - acetyl-2,6-dimethylaniline can be recovered in purified free base form.

*Example 21*

Alpha - [(1 - methyl - 1 - hydroxymethyl - 2 - hydroxyethyl)amino]-N-acetyl-2,6-dimethylaniline [I; $R_1$, $R_2$ and $R_5$ are $CH_3$, $R_3$ and $R_4$ are H, $R_6$ is $CH_2OH$, Alk is $CH_2$] was prepared from 19.8 g. (0.1 mole) of alpha-chloro-N-acetyl-2,6-dimethylaniline and 31.5 g. (0.3 mole) of 1-methyl-1-hydroxymethyl-2-hydroxyethylamine in 350 ml. of absolute ethanol following the manipulative procedure described above in Example 20. The product was recrystallized from ethyl acetate giving 16 g. of alpha-[(1 - methyl - 1 - hydroxymethyl - 2 - hydroxyethyl)-amino]-N-acetyl-2,6-dimethylaniline, M.P. 102.2–104.2° C. (corr.).

*Analysis.*—Calcd. for $C_{14}H_{22}N_2O_3$: $N_{Total}$, 10.52; $N_{Basic}$, 5.26. Found: $N_{Total}$, 10.56; $N_{Basic}$, 5.23.

The Threshold Activity Concentration-5 ($TAC_5$) of alpha - [(1 - methyl - 1 - hydroxymethyl - 2 - hydroxyethyl)amino]-N-acetyl-2,6-dimethylaniline determined according to the method of Bulbring and Wajda, ibid., was found to be 1.3%.

The Threshold Irritancy Concentration-4 ($TIC_4$) of alpha - [(1 - methyl - 1 - hydroxymethyl - 2 - hydroxyethyl)amino]-N-acetyl-2,6-dimethylaniline determined according to the method of Hoppe et al., ibid., and Luduena et al., ibid., was found to be 4.0%.

Intravenous toxicity studies in mice with alpha-[(1-methyl) - 1 - hydroxymethyl - 2 - hydroxyethyl)amino]-N-acetyl-2,6-dimethylaniline have shown the $LD_{50}$ to be 138±8.0 mg./kg.

*Example 22*

Alpha - {[1,1 - bis(hydroxymethyl) - 2 - hydroxyethyl]-amino}-N-acetyl-2,6-dimethylaniline [I; $R_1$ and $R_2$ are $CH_3$, $R_3$ and $R_4$ are H, $R_5$ and $R_6$ are $CH_2OH$, Alk is $CH_2$] was prepared from 19.8 g. (0.1 mole) of alpha-chloro-N-acetyl-2,6-dimethylaniline and 36.3 g. (0.3 mole) of 1,1-bis(hydroxymethyl)-2-hydroxyethylamine in 350 ml. of absolute ethanol following the manipulative procedure described above in Example 20. The product was recrystallized from ethanol giving 18.7 g. of alpha-{[1,1 - bis(hydroxymethyl) - 2 - hydroxyethyl]amino}-N-acetyl-2,6-dimethylaniline, M.P. 156.6–159.4° C. (corr.).

*Analysis.*—Calcd. for $C_{14}H_{22}N_2O_4$: $N_{Total}$, 9.93; $N_{Basic}$, 4.96. Found: $N_{Total}$, 9.86; $N_{Basic}$, 4.93.

The Threshold Activity Concentration-5 ($TAC_5$) of alpha - {[1,1 - bis(hydroxymethyl) - 2 - hydroxyethyl]-amino}-N-acetyl-2,6-dimethylaniline determined according to the method of Bulbring and Wajda, ibid., was found to be 2.0%.

The Threshold Irritancy Concentration-4 ($TIC_4$) of alpha - {[1,1 - bis(hydroxymethyl) - 2 - hydroxyethyl]-amino}-N-acetyl-2,6-dimethylaniline determined according to the method of Hoppe et al., ibid., and Luduena et al., ibid., was found to be 4.0%.

Intravenous toxicity studies in mice with alpha-{[1,1-bis(hydroxymethyl) - 2 - hydroxyethyl]amino} - N-acetyl-2,6-dimethylaniline have shown the $LD_{50}$ to be 470±39 mg./kg.

Example 23

Beta - [(1 - methyl-1-ethyl-2-hydroxyethyl)amino]-N-isopropyl-N-propionylaniline [I; $R_1$, $R_2$ and $R_3$ are H, $R_4$ is $(CH_3)_2CH$, $R_5$ is $CH_3$, $R_6$ is $CH_3CH_2$, Alk is $CH_2CH_2$]: By following the manipulative procedure described above in Example 20, substituting for the reactants used therein molar equivalent amounts of a beta-halo-N-isopropyl-N-propionylaniline and 1-methyl-1-ethyl-2-hydroxyethylamine, there can be obtained beta-[(1-methyl-1-ethyl-2-hydroxyethyl)amino]-N-isopropyl-N-propionylaniline.

Example 24

Alpha - [(1 - ethyl-1-hydroxymethyl-2-hydroxyethyl)amino] - N - ethyl-N-propionyl-2-chloro-6-methylaniline [I; $R_1$ is $CH_3$, $R_2$ is Cl, $R_3$ is H, $R_4$ and $R_5$ are $C_2H_5$, $R_6$ is $CH_2OH$, Alk is $CC_3$]: By following the manipulative procedure described above in Example 20, substituting for the reactants used therein a molar equivalent amount of an alpha-halo-N-ethyl-N-propionyl-2-chloro-6-methylaniline and 1-ethyl-1-hydroxymethyl-2-hydroxyethylamine, there can be obtained alpha-[(1-ethyl-1-hydroxymethyl - 2 - hydroxyethyl)amino]-N-ethyl-N-propionyl-2-chloro-6-methylaniline.

Example 25

Gamma - [(1 - isopropyl-1-hydroxymethyl-2-hydroxyethyl)amino] - N-n-propyl-N-butyryl-2-bromo-6-methylaniline [I; $R_1$ is $CH_3$, $R_2$ is Br, $R_3$ is H, $R_4$ is n-$C_3H_7$, $R_5$ is $(CH_3)_2CH$, $R_6$ is $CH_2OH$, Alk is $(CH_2)_3$]: By following the manipulative procedure described above in Example 20, substituting for the reactants used therein molar equivalent amounts of a gamma-halo-N-n-propyl-N-butyryl-2-bromo-6-methylaniline and 1-isopropyl-1-hydroxymethyl-2-hydroxyethylamine, there can be obtained gamma - [(1-isopropyl-1-hydroxymethyl-2-hydroxyethyl)amino]-N-n-propyl-N-butyryl-2-bromo-6-methylaniline.

Example 26

Alpha - methyl - beta - [(1,1-diethyl-2-hydroxyethyl)amino]-N-methyl-N-propionyl-2,6-dimethylaniline [I; $R_1$, $R_2$ and $R_4$ are $CH_3$, $R_3$ is H, $R_5$ and $R_6$ are $C_2H_5$, Alk is $CH(CH_3)CH_2$]: By following the manipulative procedure described above in Example 20, substituting for the reactants used therein molar equivalent amounts of an alpha - methyl - beta-halo-N-methyl-N-propionyl-2,6-dimethylaniline and 1,1-diethyl-2-hydroxyethylamine, there can be obtained alpha-methyl-beta-[(1,1-diethyl-2-hydroxyethyl)amino] - N - methyl-N-propionyl-2,6-dimethylaniline.

Example 27

Beta - [(1 - isobutyl - 1-hydroxymethyl-2-hydroxyethyl)amino]-N-butyryl-2,4,6-triisopropylaniline [I; $R_1$ and $R_2$ are $(CH_3)_2CH$, $R_3$ is 4-$(CH_3)_2CH$, $R_4$ is H, $R_5$ is iso-$C_4H_9$, $R_6$ is $CH_2OH$, Alk is $CH_2CH(CH_3)$]. By following the manipulative procedure described above in Example 20, substituting for the reactants used therein molar equivalent amounts of a beta-halo-N-butyryl-2,4,6-triisopropyl-aniline and 1-isobutyl-1-hydroxymethyl-2-hydroxyethylamine, there can be obtained beta-[(1-isobutyl-1-hydroxymethyl - 2-hydroxyethyl)-amino]-N-butyryl-2,4,6-triisopropylaniline.

Example 28

Delta - [(1 - methyl-1-t-butyl-2-hydroxyethyl)amino]-N-ethyl-N-valeryl-2,6-dimethylaniline [I; $R_1$, $R_2$ and $R_6$ are $CH_3$, $R_3$ is H, $R_4$ is $C_2H_5$, $R_5$ is t-$C_4H_9$, Alk is $(CH_2)_4$]: By following the manipulative procedure described above in Example 20, substituting for the reactants used therein molar equivalent amounts of a delta-halo-N-ethyl-N-valeryl-2,6-dimethylaniline and 1-methyl-1-t-butyl-2-hydroxyethylamine, there can be obtained delta-[(1-methyl-1-t-butyl - 2-hydroxyethyl)amino]-N-ethyl-N-valeryl-2,6-dimethylaniline.

Example 29

Gamma - [(1 - isobutyl-1-isopropyl-2-hydroxyethyl)amino]-N-n-propyl-N-valeryl-2,6-dimethylaniline [I; $R_1$ and $R_2$ are $CH_3$, $R_3$ is H, $R_4$ is n-$C_3H_7$, $R_5$ is $(CH_3)_2CH$, $R_6$ is iso-$C_4H_9$, Alk is $CH_2CH_2CH(CH_3)$]: By following the manipulative procedure described above in Example 20, substituting for the reactants used therein molar equivalent amounts of an alpha-methyl-gamma-halo-N-n-propyl-N-butyryl-2,6-dimethylaniline and 1-isobutyl-1-isopropyl-2-hydroxyethylamine, there can be obtained gamma - [(1-isobutyl-1-isopropyl-2-hydroxyethyl)amino]-N-n-propyl-N-valeryl-2,6-dimethylaniline.

Example 30

Epsilon - [(1 - n-propyl-1-hydroxymethyl-2-hydroxyethyl)amino] - N - n-butyl-N-caproyl-4-n-butoxy-2,6-dimethylaniline [I; $R_1$ and $R_2$ are $CH_3$, $R_3$ is 4-n-$C_4H_9O$, $R_4$ is n-$C_4H_9$, $R_5$ is n-$C_3H_7$, $R_6$ is $CH_2OH$, Alk is $(CH_2)_5$]: By reacting 1,4-dibromobutane with one molar equivalent of diethyl malonate in the presence of an acid-acceptor, for example sodium ethoxide in an ethanol solvent, there can be obtained diethyl alpha-(4-bromobutyl) malonate. By heating the latter in aqueous alkali and isolating the product from an acid medium, there can be obtained epsilon bromocaproic acid. By reacting the latter with phosphorous tribromide, there can be obtained epsilon bromocaproyl bromide. By reacting the latter with N-n-butyl-4-n-butoxy-2,6-dimethylaniline in the presence of an acid-acceptor according to the manipulative procedure described above in Example 5, there can be obtained epsilon bromocaproyl -N -n-butyl-N-caproyl-4-n-butoxy-2,6-dimethylaniline. By reacting the latter with 1-n-propyl-1-hydroxymethyl-2-hydroxyethylamine according to the manipulative procedure described above in Example 20, there can be obtained epsilon-[(1-n-propyl-1-hydroxymethyl - 2-hydroxyethyl)amino]-N-n-butyl-N-caproyl-4-n-butoxy-2,6-dimethylaniline.

Example 31

Alpha - [(1,1 - dimethyl-2-hydroxyethyl)amino]-N-methyl-N-acetyl-4-t-butyl-2,6-dimethylaniline [I; $R_1$, $R_2$, $R_4$, $R_5$ and $R_6$ are $CH_3$, $R_3$ is 4-$(CH_3)_3C$, Alk is $CH_2$]: By following the manipulative procedure described above in Example 20, substituting for the alpha-chloro-N-acetyl-2,6-dimethylaniline used therein a molar equivalent amount of an alpha-halo-N-methyl-N-acetyl-4-t-butyl-2,6-dimethylaniline, there can be obtained alpha-[(1,1-dimethyl - 2-hydroxyethyl)amino]-N-methyl-N-acetyl-4-t-butyl-2,6-dimethylaniline.

Example 32

Alpha - [(1,1 - dimethyl-2-hydroxyethyl)amino]-N-acetyl-2-ethyl-4-methoxy-6-methylaniline [I; $R_1$, $R_5$ and $R_6$ are $CH_3$, $R_2$ is $C_2H_5$, $R_3$ is 4-$CH_3O$, $R_4$ is H, Alk is $CH_2$]: By following the manipulative procedure described above in Example 20, substituting for the alpha-chloro-N-acetyl-2,6-dimethylaniline used therein a molar equivalent amount of an alpha-halo-N-acetyl-2-ethyl-4-methoxy-6-methylaniline, there can be obtained alpha-[(1,1 - dimethyl-2-hydroxyethyl)amino]-N-acetyl-2-ethyl-4-methoxy-6-methylaniline.

Example 33

Alpha - [(1,1 - dimethyl-2-hydroxyethyl)amino]-N-acetyl-2-t-butyl-6-methyl-4-n-propoxyaniline [I; $R_1$, $R_5$ and $R_6$ are $CH_3$, $R_2$ is $(CH_3)_3C$, $R_3$ is 4-n-$C_3H_7O$, $R_4$ is H, Alk is $CH_2$]: By following the manipulative procedure described above in Example 20, substituting for the alpha-chloro-N-acetyl-2,6-dimethylaniline used therein a molar equivalent amount of an alpha-halo-N-acetyl-2-t-butyl-6-methyl-4-n-propoxyaniline, there can be obtained alpha-[(1,1 - dimethyl-2-hydroxyethyl)amino]-N-acetyl-2-t-butyl-6-methyl-4-n-propoxyaniline.

Example 34

Alpha - [(1,1 - dimethyl - 2 - hydroxyethyl)amino]-N-acetyl-2,6-dimethyl-4-isopropylaniline [I; $R_1$, $R_2$, $R_5$ and $R_6$ are $CH_3$, $R_3$ is 4-$(CH_3)_2CH$, $R_4$ is H, Alk is $CH_2$]: By following the manipulative procedure described above in Example 20, substituting for the alpha-chloro-N-acetyl-2,6-dimethylaniline used therein a molar equivalent amount of an alpha - halo-N-acetyl-2,6-dimethyl-4-isopropylaniline, there can be obtained alpha-[(1,1-dimethyl-2 - hydroxyethyl)amino] - N - acetyl - 2,6-dimethyl-4-isopropylaniline.

Example 35

Alpha - [(1,1 - dimethyl - 2-hydroxyethyl)amino]-N-n-butyl-N-acetyl-2,3,6-trimethylaniline [I; $R_1$, $R_2$, $R_5$ and $R_6$ are $CH_3$, $R_3$ is 3-$CH_3$, $R_4$ is n-$C_4H_9$, Alk is $CH_2$]: By following the manipulative procedure described above in Example 20, substituting for the alpha-chloro-N-acetyl-2,6-dimethylaniline used therein a molar equivalent amount of an alpha - halo-N-n-butyl-N-acetyl-2,3,6-trimethylaniline, there can be obtained alpha-[(1,1-dimethyl-2 - hydroxyethyl)amino] - N - n - butyl-N-acetyl-2,3,6-trimethylaniline.

Example 36

Alpha - [(1,1 - dimethyl - 2-hydroxyethyl)amino]-N-acetyl-2-isopropyl-6-methylaniline [I; $R_1$, $R_5$ and $R_6$ are $CH_3$, $R_2$ is $(CH_3)_2CH$, $R_3$ and $R_4$ are H, Alk is $CH_2$]: By following the manipulative procedure described above in Example 20, substituting for the alpha-chloro-N-acetyl-2,6-dimethylaniline used therein a molar equivalent amount of an alpha-halo-N-acetyl-2-isopropyl-6-methylaniline, there can be obtained alpha-[(1,1-dimethyl-2-hydroxyethyl)amino] - N - acetyl - 2-isopropyl-6-methylaniline.

Example 37

Alpha - [(1,1 - dimethyl - 2-hydroxyethyl)amino]-N-acetyl-2,6-diethyl-4-methylaniline [I; $R_1$ and $R_2$ are $C_2H_5$, $R_3$ is 4-$CH_3$, $R_4$ is H, $R_5$ and $R_6$ are $CH_3$, Alk is $CH_2$]: By following the manipulative procedure described above in Example 20, substituting for the alpha-chloro-N-acetyl-2,6-dimethylaniline used therein a molar equivalent amount of an alpha-halo-N-acetyl-2,6-diethyl-4-methylaniline, there can be obtained alpha-[(1,1-dimethyl-2-hydroxyethyl)amino]-N-acetyl-2,6-diethyl-4-methylaniline.

Example 38

Alpha - [(1,1 - dimethyl - 2-hydroxyethyl)amino]-N-acetyl-2,4-dimethyl-6-isopropylaniline [I; $R_1$, $R_5$ and $R_6$ are $CH_3$, $R_2$ is $(CH_3)_2CH$, $R_3$ is 4-$CH_3$, $R_4$ is H, Alk is $CH_2$]: By following the manipulative procedure described above in Example 20, substituting for the alpha-chloro-N-acetyl-2,6-dimethylaniline used therein a molar equivalent amount of an alpha-halo-N-acetyl-2,4-dimethyl-6-isopropylaniline, there can be obtained alpha-[(1,1-dimethyl-2 - hydroxyethyl)amino] - N - acetyl - 2,4-dimethyl-6-isopropylaniline.

Example 39

Alpha - (4,4 - dimethyl-3-oxazolidinyl)-N-acetyl-2,6-dimethylaniline [II; $R_1$, $R_2$, $R_5$ and $R_6$ are $CH_3$, $R_3$ and $R_4$ are H, Alk is $CH_2$]: A solution of 7.5 g. (0.03 mole) of alpha - [(1,1 -dimethyl-2-hydroxyethyl)amino]-N-acetyl-2,6-dimethylaniline and 0.94 g. (0.032 mole) of paraformaldehyde in 100 ml. of dry benzene was heated under reflux using a Dean-Stark trap for separation of the water formed in the reaction. The solution was filtered, the solvent removed under reduced pressure and the residual white solid recrystallized from an ethyl acetate-hexane mixture giving 4.2 g. of alpha-(4,4-dimethyl-3-oxazolidinyl)-N-acetyl-2,6-dimethylaniline, M.P. 146.6–149.4° C. (corr.).

*Analysis.*—Calcd. for $C_{15}H_{22}N_2O_2$: C, 68.65; H, 8.45; $N_{Total}$, 10.68. Found: C, 68.34; H, 8.24; $N_{Total}$, 10.69.

Pharmacological evaluation of alpha-(4,4-dimethyl-3-oxazolidinyl) - N - acetyl-2,6-dimethylaniline in aqueous solution in the form of its acid-addition salts administered intradermally in guinea pigs according to the method of Bulbring and Wajda, ibid., described above, has shown that the compound possesses local anesthetic activity. The Threshold Activity Concentration–5 ($TAC_5$) for the compound was thus found to be 0.4%.

Alpha - (4,4 - dimethyl-3-oxazolidinyl)-N-acetyl-2,6-dimethylaniline reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3 - indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate and boron trifluoride salts.

Alpha - (4,4 - dimethyl - 3-oxazolidinyl)-N-acetyl-2,6-dimethylaniline reacts with hydriodic acid to form alpha-(4,4 - dimethyl - 3 - oxazolidinyl)-N-acetyl-2,6-dimethylaniline hydriodide, useful as a characterizing intermediate.

Alpha - (4,4 - dimethyl - 3-oxazolidinyl)-N-acetyl-2,6-dimethylaniline in the form of its hydriodide salt can be converted to the hydrochloride salt by passing an aqueous solution of the former over an ion-exchange resin saturated with chloride ions, for example, Rohm and Haas' Amberlite® IRA–400 resin.

Alpha - (4,4 - dimethyl - 3-oxazolidinyl)-N-acetyl-2,6-dimethylaniline can be converted to its hydriodide salt and the latter recrystallized for purification purposes from an appropriate organic solvent. On suspension of the hydriodide in dilute aqueous sodium hydroxide, extraction of the suspension with chloroform, and removal of the chloroform from the extracts, alpha-(4,4-dimethyl-3-oxazolidinyl) - N - acetyl-2,6-dimethylaniline can be recovered in purified free base form.

Example 40

Alpha-(4-hydroxymethyl-4 - methyl - 3 - oxazolidinyl)-N-acetyl-2,6-dimethylaniline [II; $R_1$, $R_2$ and $R_5$ are $CH_3$, $R_3$ and $R_4$ are H, $R_6$ is $CH_2OH$, Alk is $CH_2$]: By following the manipulative procedure described above in Example 39, substituting for the alpha-[(1,1-dimethyl-2-hydroxyethyl)amino] - N - acetyl - 2,6 - dimethylaniline used therein a molar equivalent amount of alpha-[(1-methyl-1 - hydroxymethyl - 2 - hydroxyethyl)amino] - N - acetyl-2,6-dimethylaniline, there can be obtained alpha-(4-hydroxymethyl - 4 - methyl - 3 - oxazolidinyl) - N - acetyl-2,6-dimethylaniline.

*Example 41*

Alpha - [4,4 - bis(hydroxymethyl) - 3 - oxazolidinyl]-N-acetyl-2,6-dimethylaniline [II; $R_1$ and $R_2$ are $CH_3$, $R_3$ and $R_4$ are H, $R_5$ and $R_6$ are $CH_2OH$, Alk is $CH_2$]: By following the manipulative procedure described above in Example 39, substituting for the alpha-[(1,1-dimethyl-2-hydroxyethyl)amino]-N-acetyl-2,6-dimethylaniline used therein a molar equivalent amount of alpha-{[1,1-bis(hydroxymethyl) - 2 - hydroxyethyl]amino} - N - acetyl-2,6-dimethylaniline, there can be obtained alpha-[4,4-bis(hydroxymethyl)-3-oxazolidinyl]-N - acetyl-2,6-dimethylaniline.

*Example 42*

Beta-(4-methyl-4-ethyl - 3 - oxazolidinyl)-N-isopropyl-N-propionylaniline [II; $R_1$, $R_2$ and $R_3$ are H, $R_4$ is $(CH_3)_2CH$, $R_5$ is $CH_3$, $R_6$ is $CH_3CH_2$, Alk is $CH_2CH_2$]: By following the manipulative procedure described above in Example 39, substituting for the alpha-[(1,1-dimethyl-2-hydroxyethyl)amino]-N-acetyl-2,6-dimethylaniline used therein a molar equivalent amount of beta-[(1-methyl-1 - ethyl - 2 - hydroxyethyl) - amino] - N - isopropyl - N-propionylaniline, there can be obtained beta-(4-methyl-4-ethyl-3-oxazolidinyl)-N-isopropyl-N-propionylaniline.

*Example 43*

Alpha - (4 - ethyl - 4 - hydroxymethyl-3-oxazolidinyl)-N-ethyl-N-propionyl-2-chloro-6-methylaniline [II; $R_1$ is $CH_3$, $R_2$ is Cl, $R_3$ is H, $R_4$ and $R_5$ are $C_2H_5$, $R_6$ is $CH_2OH$, Alk is $CHCH_3$]: By following the manipulative procedure described above in Example 39, substituting for the alpha-[(1,1 - dimethyl - 2 - hydroxyethyl)amino] - N - acetyl-2,6-dimethylaniline used therein a molar equivalent amount of alpha-[(1-ethyl-1-hydroxymethyl-2-hydroxyethyl)-amino]-N-ethyl - N - propionyl-2-chloro-6-methylaniline, there can be obtained alpha-(4-ethyl-4-hydroxymethyl-3-oxazolidinyl) - N - ethyl - N-propionyl-2-chloro-6-methylaniline.

*Example 44*

Gamma-(4-isopropyl-4-hydroxymethyl-3-oxazolidinyl)-N-n-propyl-N-butyryl-2-bromo-6-methylaniline [II; $R_1$ is $CH_3$, $R_2$ is Br, $R_3$ is H, $R_4$ is n-$C_3H_7$, $R_5$ is $(CH_3)_2CH$, $R_6$ is $CH_2OH$, Alk is $(CH_2)_3$]: By following the manipulative procedure described above in Example 39, substituting for the alpha-[(1,1-dimethyl-2-hydroxyethyl)amino]-N-acetyl-2,6-dimethylaniline used therein a molar equivalent amount of gamma-[(1-isopropyl-1-hydroxymethyl-2-hydroxyethyl)amino]-N-n-propyl-N-butyryl-2-bromo-6-methylaniline, there can be obtained gamma-(4-isopropyl-4-hydroxymethyl-3-oxazolidinyl)-N-n-propyl-N-butyryl-2-bromo-6-methylaniline.

*Example 45*

Alpha - methyl - beta - (4,4 - diethyl - 3 - oxazolidinyl)-N-methyl-N-propionyl-2,6-dimethylaniline [II; $R_1$, $R_2$ and $R_4$ are $CH_3$, $R_3$ is H, $R_5$ and $R_6$ are $C_2H_5$, Alk is $CH(CH_3)CH_2$]: By following the manipulative procedure described above in Example 39, substituting for the alpha-[(1,1 - dimethyl - 2 - hydroxyethyl)amino] - N-acetyl-2,6-dimethylaniline used therein a molar equivalent amount of alpha-methyl-beta-[(1,1 - diethyl - 2 - hydroxyethyl) - amino] - N - methyl - N-propionyl-2,6-dimethylaniline, there can be obtained alpha-methyl-beta-(4,4-diethyl - 3 - oxazolidinyl) - N - methyl - N - propionyl-2,6-dimethylaniline.

*Example 46*

Beta-(4-isobutyl - 4 - hydroxymethyl - 3-oxazolidinyl)-N-butyryl-2,4,6-triisopropylaniline [II; $R_1$ and $R_2$ are $(CH_3)_2CH$, $R_3$ is 4-$(CH_3)_2CH$, $R_4$ is H, $R_5$ is iso-$C_4H_9$, $R_6$ is $CH_2OH$, Alk is $CH_2CH(CH_3)$]: By following the manipulative procedure described above in Example 39, substituting for the alpha-[(1,1-dimethyl-2-hydroxyethyl)amino]-N-acetyl-2,6-dimethylaniline used therein a molar equivalent amount of beta-[(1-isobutyl-1-hydroxymethyl-2-hydroxyethyl)amino] - N - butyryl - 2,4,6 - triisopropylaniline, there can be obtained beta-(4-isobutyl-4-hydroxymethyl-3 - oxazolidinyl) - N - butyryl - 2,4,6-triisopropylaniline.

*Example 47*

Delta-(4-methyl-4-t-butyl-3 - oxazolidinyl) - N - ethyl-N-valeryl-2,6-dimethylaniline [II; $R_1$, $R_2$ and $R_6$ are $CH_3$, $R_3$ is H, $R_4$ is $C_2H_5$, $R_5$ is t-$C_4H_9$, Alk is $(CH_2)_4$]: By following the manipulative procedure described above in Example 39, substituting for the alpha-[(1,1-dimethyl-2-hydroxyethyl)amino]-N-acetyl-2,6 - dimethylaniline used therein a molar equivalent amount of delta-[(1-methyl-1-t-butyl-2 - hydroxyethyl)amino] - N - ethyl - N-valeryl-2,6-dimethylaniline, there can be obtained delta-(4-methyl-4-t-butyl-3-oxazolidinyl) - N - ethyl - N - valeryl-2,6-dimethylaniline.

*Example 48*

Gamma - (4 - isobutyl - 4 - isopropyl - 3-oxazolidinyl)-N-n-propyl-N-valeryl-2,6-dimethylaniline [II; $R_1$ and $R_2$ are $CH_3$, $R_3$ is H, $R_4$ is n-$C_3H_7$, $R_5$ is $(CH_3)_2CH$, $R_6$ is iso-$C_4H_9$, Alk is $CH(CH_3)CH_2CH_2$]: By following the manipulative procedure described above in Example 39, substituting for the alpha-[(1,1-dimethyl-2-hydroxyethyl)amino]-N-acetyl-2,6-dimethylaniline used therein a molar equivalent amount of gamma-[(1-isobutyl-1-isopropyl-2-hydroxyethyl)amino]-N-n-propyl-N-valeryl-2,6-dimethylaniline, there can be obtained gamma-(4-isobutyl-4-isopropyl - 3 - oxazolidinyl) - N - n - propyl - N-valeryl-2,6-dimethylaniline.

*Example 49*

Epsilon-(4-n-propyl-4 - hydroxymethyl-3-oxazolidinyl)-N-n-butyl-N-caproyl-4-n-butoxy - 2,6 - dimethylaniline [II; $R_1$ and $R_2$ are $CH_3$, $R_3$ is 4-n-$C_4H_9O$, $R_4$ is n-$C_4H_9$, $R_5$ is n-$C_3H_7$, $R_6$ is $CH_2OH$, Alk is $(CH_2)_5$]: By following the manipulative procedure described above in Example 39, substituting for the alpha-[(1,1-dimethyl-2-hydroxyethyl)amino]-N-acetyl-2,6-dimethylaniline used therein a molar equivalent amount of epsilon-[(1-n-propyl-1-hydroxymethyl-2-hydroxyethyl)amino] - N - n-butyl-N-caproyl-4-n-butoxy-2,6-dimethylaniline, there can be obtained epsilon-(4-n-propyl - 4 - hydroxymethyl-3-oxazolidinyl)-N-n-butyl-N-caproyl-4-n-butoxy-2,6-dimethylaniline.

*Example 50*

Alpha - (4,4 - dimethyl - 3 - oxazolidinyl) - N-methyl-N-acetyl-4-t-butyl-2,6-dimethylaniline [II; $R_1$, $R_2$, $R_4$, $R_5$ and $R_6$ are $CH_3$, $R_3$ is 4-$(CH_3)_3C$, Alk is $CH_2$]: By following the manipulative procedure described above in Example 39, substituting for the alpha-[(1,1-dimethyl-2-hydroxyethyl)amino]-N-acetyl-2,6-dimethylaniline used therein a molar equivalent amount of alpha-[(1,1-dimethyl - 2 - hydroxyethyl)amino] - N - methyl-N-acetyl-4-t-butyl-2,6-dimethylaniline, there can be obtained alpha-(4,4-dimethyl-3-oxazolidinyl) - N - methyl - N-acetyl-4-t-butyl-2,6-dimethylaniline.

*Example 51*

Alpha-(4,4-dimethyl - 3 - oxazolidinyl)-N-acetyl-2-ethyl-4-methoxy-6-methylaniline [II; $R_1$, $R_5$ and $R_6$ are $CH_3$, $R_2$ is $C_2H_5$, $R_3$ is 4-$CH_3O$, $R_4$ is H, Alk is $CH_2$]: By following the manipulative procedure described above in Example 39, substituting for the alpha-[(1,1-dimethyl-2-hydroxyethyl)amino]-N-acetyl-2,6-dimethylaniline used therein a molar equivalent amount of alpha-[(1,1-dimethyl-2-hydroxyethyl)amino]-N-acetyl - 2 - ethyl-4-methoxy-6-methylaniline, there can be obtained alpha-(4,4-dimethyl-3-oxazolidinyl)-N-acetyl - 2 - ethyl-4-methoxy-6-methylaniline.

Example 52

Alpha-(4,4-dimethyl-3-oxazolidinyl) - N - acetyl-2-t-butyl-6-methyl-4-n-propoxyaniline [II; $R_1$, $R_5$ and $R_6$ are $CH_3$, $R_2$ is $(CH_3)_3C$, $R_3$ is 4-n-$C_3H_7O$, $R_4$ is H, Alk is $CH_2$]: By following the manipulative procedure described above in Example 39, substituting for the alpha-[(1,1-dimethyl-2-hydroxyethyl)amino] - N - acetyl-2,6-dimethylanilne used therein a molar equivalent amount of alpha-[(1,1-dimethyl-2-hydroxyethyl)amino] - N - acetyl-2-t-butyl-6-methyl-4-n-propoxyaniline, there can be obtained alpha-(4,4-dimethyl-3-oxazolidinyl) - N - acetyl-2-t-butyl-6-methyl-4-n-propoxyaniline.

Example 53

Alpha-(4,4-dimethyl-3-oxazolidinyl) - N - acetyl-2,6-dimethyl-4-isopropylaniline [II; $R_1$, $R_2$, $R_5$ and $R_6$ are $CH_3$, $R_3$ is 4-$(CH_3)_2CH$, $R_4$ is H, Alk is $CH_2$]: By following the manipulative procedure described above in Example 39, substituting for the alpha-[(1,1-dimethyl-2-hydroxyethyl)amino]-N-acetyl - 2,6 - dimethylaniline used therein a molar equivalent amount of alpha-[(1,1-dimethyl-2-hydroxyethyl)amino]-N-acetyl - 2,6 - dimethyl-4-isopropylaniline, there can be obtained alpha-(4,4-dimethyl-3-oxazolidinyl)-N-acetyl-2,6-dimethyl - 4 - isopropylaniline.

Example 54

Alpha-(4,4-dimethyl-3-oxazolidinyl) - N - n - butyl-N-acetyl-2,3,6-trimethylaniline [II; $R_1$, $R_2$, $R_5$ and $R_6$ are $CH_3$, $R_3$ is 3-$CH_3$, $R_4$ is n-$C_4H_9$, Alk is $CH_2$]: By following the manipulative procedure described above in Example 39, substituting for the alpha-[(1,1-dimethyl-2-hydroxyethyl)amino]-N-acetyl - 2,6 - dimethylaniline used therein a molar equivalent amount of alpha-[(1,1-dimethyl-2-hydroxyethyl)amino]-N-n-butyl - N - acetyl-2,3,6-trimethylaniline, there can be obtained alpha-(4,4-dimethyl-3-oxazolidinyl)-N-n-butyl - N - acetyl-2,3,6-trimethylaniline.

Example 55

Alpha-(4,4-dimethyl-3-oxazolidinyl) - N - acetyl-2-isopropyl-6-methylaniline [II; $R_1$, $R_5$ and $R_6$ are $CH_3$, $R_2$ is $(CH_3)_2CH$, $R_3$ and $R_4$ are H, Alk is $CH_2$]: By following the manipulative procedure described above in Example 39, substituting for the alpha-[(1,1-dimethyl-2-hydroxyethyl)amino]-N-acetyl-2,6-dimethylaniline used therein a molar equivalent amount of alpha-[(1,1-dimethyl-2-hydroxyethyl)amino]-N-acetyl-2-isopropyl - 6 - methylaniline, there can be obtained alpha-(4,4-dimethyl-3-oxazolidinyl)-N-acetyl-2-isopropyl-6-methylaniline.

Example 56

Alpha-(4,4-dimethyl-3-oxazolidinyl) - N - acetyl-2,6-diethyl-4-methylaniline [II; $R_1$ and $R_2$ are $C_2H_5$, $R_3$ is 4-$CH_3$, $R_4$ is H, $R_5$ and $R_6$ are $CH_3$, Alk is $CH_2$]: By following the manipulative procedure described above in Example 39, substituting for the alpha-[(1,1-dimethyl-2-hydroxyethyl)amino] - N - acetyl - 2,6 - dimethylaniline used therein a molar equivalent amount of alpha-[(1,1-dimethyl-2-hydroxyethyl)amino] - N - acetyl-2,6-diethyl-4-methylaniline, there can be obtained alpha-(4,4-dimethyl-3-oxazolidinyl) - N - acetyl-2,6-diethyl-4-methylaniline.

Example 57

Alpha-(4,4-dimethyl-3-oxazolidinyl) - N - acetyl-2,4-dimethyl-6-isopropylaniline [II; $R_1$, $R_5$ and $R_6$ are $CH_2$, $R_1$ is $(CH_3)_2CH$, $R_3$ is 4-$CH_3$, $R_4$ is H, Alk is $CH_2$]: By following the manipulative procedure described above in Example 39, substituting for the alpha-[(1,1-dimethyl-2-hydroxyethyl)amino]-N-acetyl - 2,6 - dimethylaniline used therein a molar equivalent amount of alpha-[(1,1-dimethyl-2-hydroxyethyl)amino]-N-acetyl - 2,4 - dimethyl-6-isopropylaniline, there can be obtained alpha-(4,4-dimethyl-3-oxazolidinyl)-N-acetyl-2,4-dimethyl - 6 - isopropylaniline.

This application is a division of my co-pending United States patent application Serial No. 23,919 (filed April 22, 1960).

I claim:

1. A member of the group consisting of (A) a compound of the formula

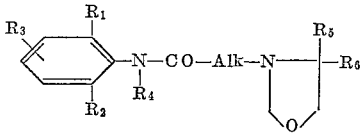

and (B) an acid-addition salt thereof wherein $R_1$, $R_2$ and $R_3$ each independently represents a member of the group consisting of hydrogen, lower-alkyl containing from one to four carbon atoms, lower-alkoxy containing from one to four carbon atoms and halogen; $R_4$ represents a member of the group consisting of hydrogen and lower-alkyl containing from one to four carbon atoms; $R_5$ and $R_6$ each independently represents a member of the group consisting of lower-alkyl containing from one to four carbon atoms and hydroxymethyl; and Alk represents lower-alkylene containing from one to five carbon atoms.

2. An acid-addition salt of a compound of the formula

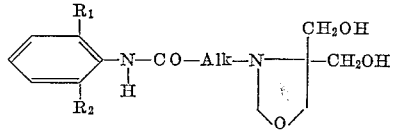

wherein $R_1$ and $R_2$ each represents lower-alkyl containing from one to four carbon atoms; and Alk represents lower-alkylene containing from one to five carbon atoms.

3. An acid-addition salt of a compound of the formula

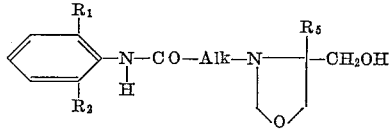

wherein $R_1$, $R_2$ and $R_5$ each represents lower-alkyl containing from one to four carbon atoms; and Alk represents lower-alkylene containing from one to five carbon atoms.

4. An acid-addition salt of a compound of the formula

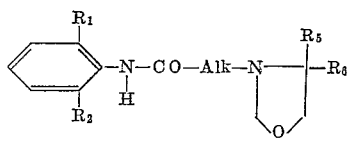

wherein $R_1$, $R_2$, $R_5$ and $R_6$ each represents lower-alkyl containing from one to four carbon atoms; and Alk represents lower-alkylene containing from one to five carbon atoms.

5. An acid-addition salt of alpha-(4,4-dimethyl-3-oxazolidinyl)-N-acetyl-2,6-dimethylaniline.

References Cited in the file of this patent
UNITED STATES PATENTS 2,964,530     Zenitz _____ Dec. 13, 1960

OTHER REFERENCES

Elderfield, Heterocyclic Compounds, vol. 5 (New York, 1957), page 391.

UNITED STATES PATENT OFFICE
CERTIFICATE OF CORRECTION

Patent No. 3,152,140                          October 6, 1964

Bernard L. Zenitz

It is hereby certified that error appears in the above numbered patent requiring correction and that the said Letters Patent should read as corrected below.

Column 11, line 17, for "$CC_3$" read -- $CHCH_3$ --.

Signed and sealed this 13th day of July 1965.

(SEAL)
Attest:

ERNEST W. SWIDER                      EDWARD J. BRENNER
Attesting Officer                         Commissioner of Patents